(12) United States Patent
Paszek et al.

(10) Patent No.: US 10,796,044 B2
(45) Date of Patent: Oct. 6, 2020

(54) INTERFACE CONNECTIVITY FOR PRINTED CIRCUIT BOARD SCHEMATIC

(71) Applicant: Mentor Graphics Corporation, Wilsonville, OR (US)

(72) Inventors: Michał Paszek, Katowice (PL); Tomasz Zielski, Katowice (PL); Michał Ferdek, Katowice (PL); Paweł Cieslak, Katowice (PL); Marek Mossakowski, Katowice (PL)

(73) Assignee: Mentor Graphics Corporation, Wilsonville, OR (US)

( * ) Notice: Subject to any disclaimer, the term of this patent is extended or adjusted under 35 U.S.C. 154(b) by 112 days.

(21) Appl. No.: 16/146,749

(22) Filed: Sep. 28, 2018

(65) Prior Publication Data
US 2020/0104435 A1 Apr. 2, 2020

(51) Int. Cl.
*G06F 30/30* (2020.01)
*G06F 30/327* (2020.01)
(Continued)

(52) U.S. Cl.
CPC .......... *G06F 30/327* (2020.01); *G06F 30/392* (2020.01); *G06F 2111/12* (2020.01)

(58) Field of Classification Search
CPC ... G06F 30/327; G06F 30/392; G06F 2111/12
(Continued)

(56) References Cited

U.S. PATENT DOCUMENTS

| 5,218,557 | A | * | 6/1993 | Simoudis | ............... G06F 30/30 716/102 |
| 5,297,053 | A | * | 3/1994 | Pease | ..................... G06F 30/30 700/182 |

(Continued)

OTHER PUBLICATIONS

Anonymous, "Electrical termination—Wikipedia", Jul. 23, 2018, Retrieved from the Internet: URL:https://en.wikipedia.org/w/index.php?title=Electrical_termination&oldid=851613931 [retrieved on Nov. 7, 2019], pp. 1-4.

(Continued)

*Primary Examiner* — Jack Chiang
*Assistant Examiner* — Brandon Bowers
(74) *Attorney, Agent, or Firm* — Mentor Graphics Corporation

(57) ABSTRACT

This application discloses a computing system implementing a schematic capture tool to place and connect parts in a schematic design of a printed circuit board assembly. The computing system implementing the schematic capture tool can select a type of communication interface to connect the parts in the schematic design and identify an interface definition that corresponds to the selected type of communication interface. The schematic capture tool can locate a mapping that describes connectivity between the parts and the interface definition, and automatically modify the schematic design to include an instance of the interface definition in the schematic design and connect the parts in the schematic design to the instance of the interface definition based on the mapping. The schematic capture tool also can utilize (Continued)

the interface definition to set constraints for or add terminations to the connection between the parts in the schematic design.

18 Claims, 4 Drawing Sheets

(51) Int. Cl.
*G06F 30/392* (2020.01)
*G06F 111/12* (2020.01)

(58) Field of Classification Search
USPC .......................................................... 716/102
See application file for complete search history.

(56) References Cited

U.S. PATENT DOCUMENTS

| | | | |
|---|---|---|---|
| 9,268,895 B2* | 2/2016 | Perry | G06F 30/398 |
| 2008/0250379 A1 | 10/2008 | Takaoka et al. | |
| 2013/0326457 A1 | 12/2013 | Macmunn et al. | |
| 2018/0293204 A1* | 10/2018 | Packer Ali | G06F 1/3293 |

OTHER PUBLICATIONS

Anonymous, "Optimum Design Associates—Printed Circuit Board Design and Assembly—Designer's Handbook", Mar. 1, 2016, Retrieved from the Internet: URL:http://optimumcontentorg/wp-content/uploads/2016/03/Optimum-Design-Handbook.pdf [retrieved on Nov. 7, 2019], Section 2.6.2.9, pp. 1-84.

* cited by examiner

INTERFACE CONNECTIVITY FOR PRINTED CIRCUIT BOARD SCHEMATIC

TECHNICAL FIELD

This application is generally related to electronic design automation and, more specifically, to interface connectivity for a printed circuit board schematic.

BACKGROUND

The development of electronic devices with printed circuit boards typically involves many steps known as a design flow. This design flow typically starts with a specification for a new electronic device to be implemented with a printed circuit board, which can be transformed into a schematic design, such as a netlist, for example, by a schematic capture tool. The schematic capture tool can place and interconnect various parts into a schematic design. For example, the schematic capture tool implemented in a computing system can present a graphical view of the schematic design and allow a designer to utilize the schematic capture tool to place parts from a library onto the schematic design in the graphical view.

The schematic capture tool also can allow the designer to connect the pins of the parts with signal lines or nets in the schematic design. When the connection between placed parts implements an industrial standard, such as Peripheral Component Interconnect (PCI) Express, Universal Serial Bus (USB), or the like, the designer can read a document describing the industrial standard and then determine how to generate the connections between the pins of the placed parts. This generation of the connections between the pins of the placed parts also can include adding constraints to the generated connections, for example, to describe the electrical or physical properties of the connection, and to add terminations, such as discrete electrical components to the generated connections. Since generating connections between parts in the schematic design can include a significant amount of manual effort by the designer, the overall generation and subsequent manual verification of the schematic design can be time-consuming and error-prone.

SUMMARY

This application discloses a computing system implementing a schematic capture tool to place and connect parts in a schematic design of a printed circuit board assembly. The computing system implementing the schematic capture tool can select a type of communication interface to connect the parts in the schematic design and identify an interface definition that corresponds to the selected type of communication interface. The interface definition can describe characteristics of the selected type of communication interface, such as the signal lines, ends, or configuration, of the selected type of communication interface. The computing system implementing the schematic capture tool can locate a mapping that describes connectivity between the parts and the ends in the interface definition, and automatically modify the schematic design to include an instance of the interface definition in the schematic design and connect the parts in the schematic design to the instance of the interface definition based on the mapping. The computing system implementing the schematic capture tool also can utilize the interface definition to set constraints, such as electrical or physical properties, for signal lines connecting between pins of the parts in the schematic design. The computing system implementing the schematic capture tool also can utilize the interface definition to add terminations, such as discrete electrical components, to signal lines connecting between pins of the parts in the schematic design. Embodiments will be described below in greater detail.

DETAILED DESCRIPTION

Illustrative Operating Environment

Figure 1:
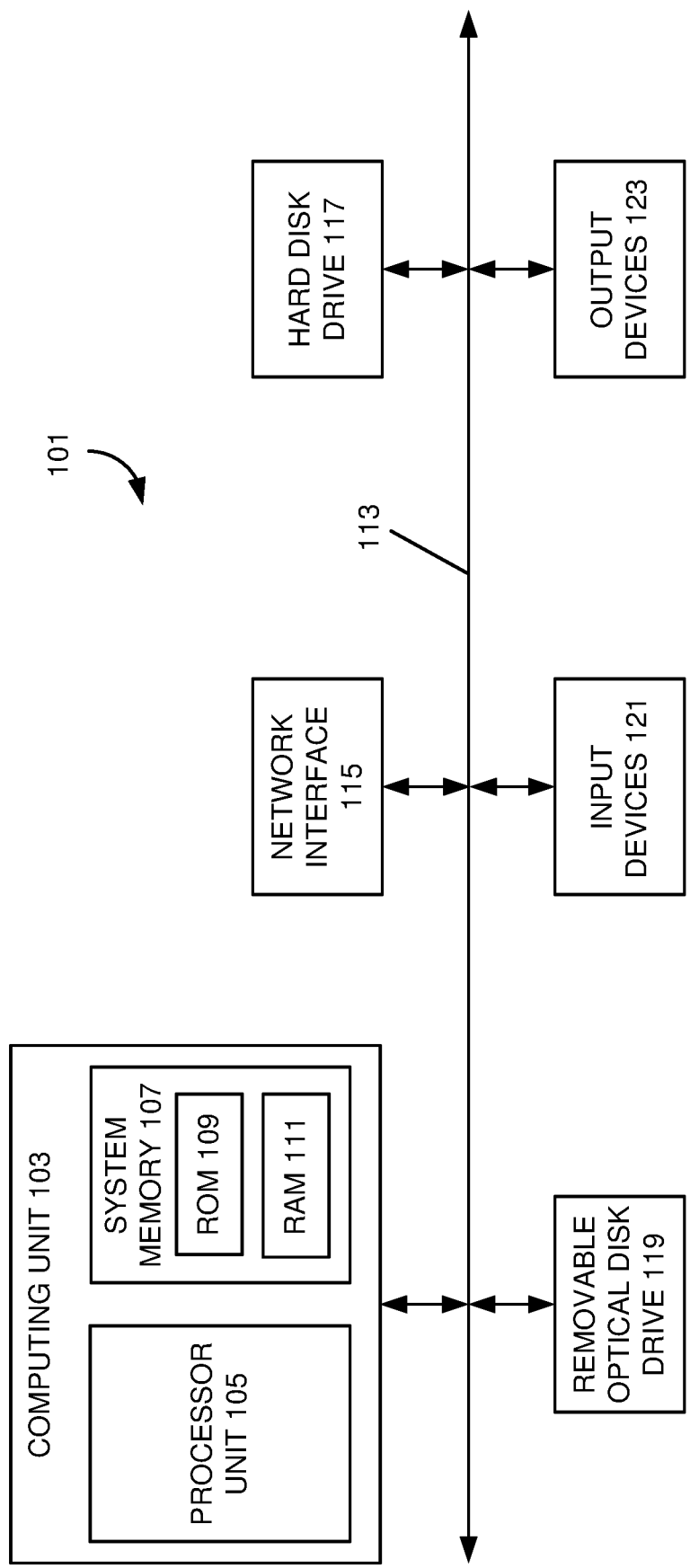
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
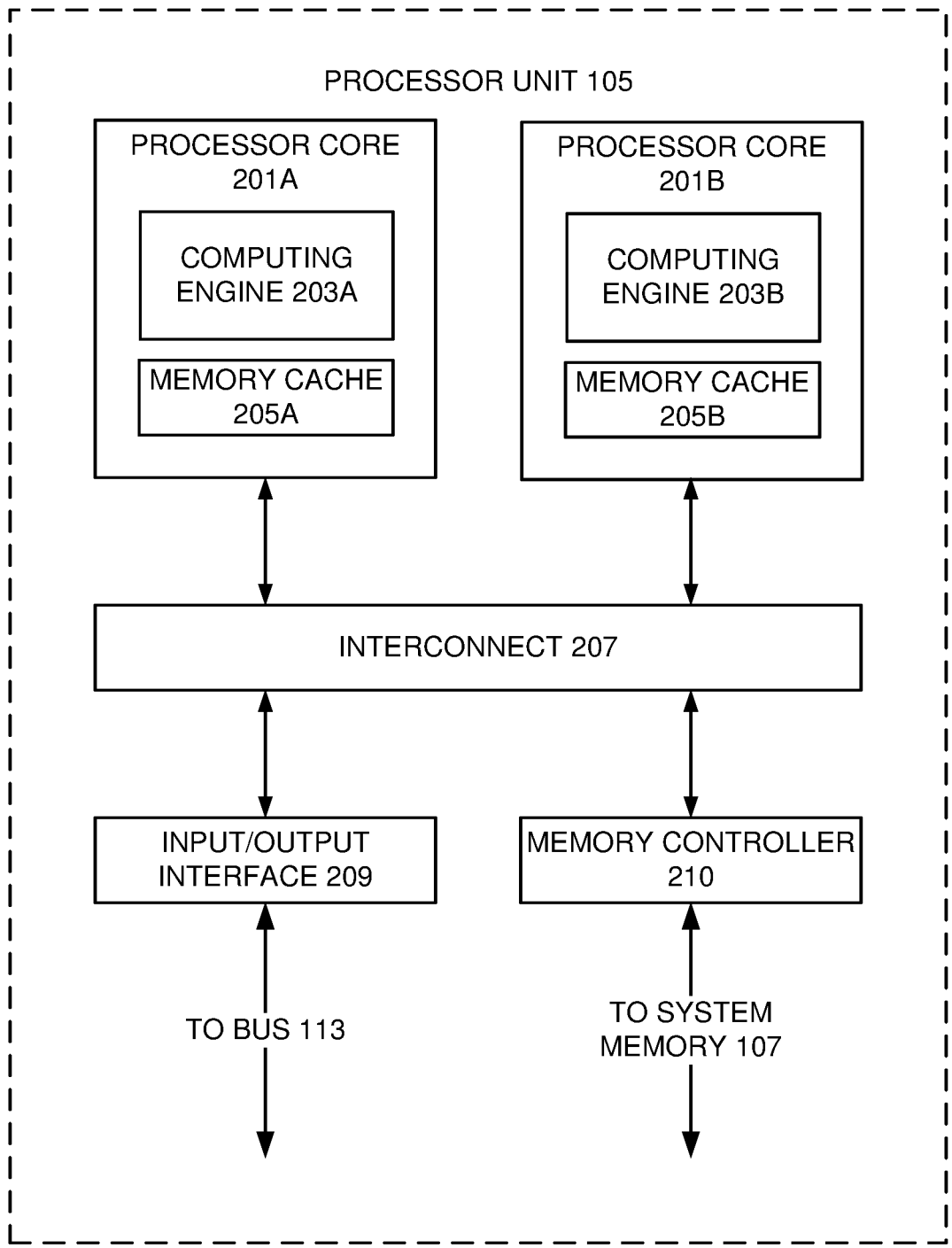

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Interface Connectivity for Printed Circuit Board Schematic

Figure 3:
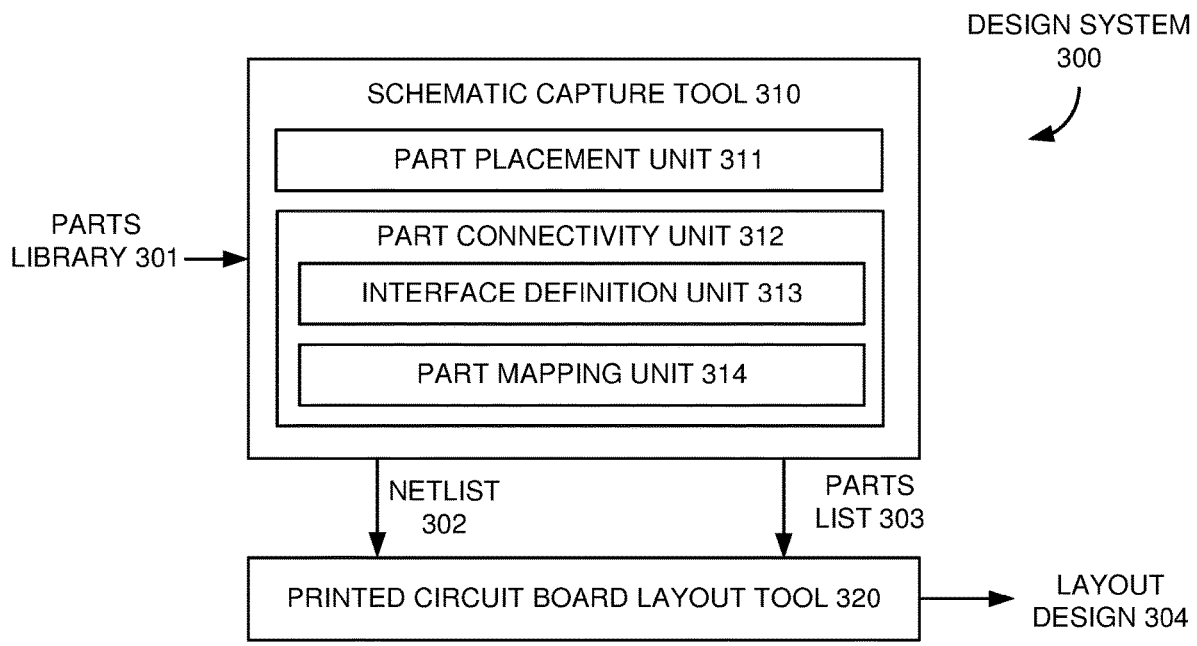
FIG. 3 illustrates an example of a design system 300 with a schematic capture tool to utilize an interface definition to generate a logical design of a printed circuit board assembly according to various embodiments.

FIG. 3 illustrates an example of a design system 300 with a schematic capture tool 310 to utilize an interface definition to generate a schematic design of a printed circuit board assembly according to various embodiments. Referring to FIG. 3, the design system 300 can be a distributed design environment, which allow for a design of a printed circuit board assembly to be performed by different communicating tools or systems. The design system 300 can include a schematic capture tool 310 to receive a parts library 301 including parts that represent electronic components available for use in a printed circuit board assembly. The parts can describe the electronic components, for example, by identifying types of the electronic components and the pins or ports of the electronic components. The schematic capture tool 310 can generate a schematic design for the printed circuit board assembly utilizing the parts from the parts library 301. The schematic design can logically or functionally describe the printed circuit board assembly with a netlist 302 and a parts list 303. The netlist 302, for example, specified in an Electronic Design Interchange Format (EDIF) or binary format, can describe nets or connectivity between various components or instances. The parts list 303 can include multiple parts from the parts library 301, which can correspond to the components or instances described in the netlist 302.

The schematic capture tool 310 can include a part placement unit 311 to identify parts from the parts library 301 and insert them into the schematic design for the printed circuit board assembly. In some embodiments, the schematic capture tool 310 can output a display presentation that, when displayed by a display device, can provide an user interface to the design environment, allowing the part placement unit 311 to place the parts from the parts library 301 into the schematic design in response to user input. The display presentation can include a graphical display window including at least one representation of the schematic design and include various tools or embedded functionality that can allow placement of the parts from the parts list 301 into the schematic design.

The schematic capture tool 310 can include a part connectivity unit 312 to connect the parts in the schematic design for the printed circuit board assembly. In some embodiments, the part connectivity unit 312 can generate connections for the placed parts in the schematic design, which can be represented in the display presentation can having representation of the schematic design. The part connectivity unit 312 can select a type of a communication interface to utilize to connect parts in the schematic design, for example, in response to user input. When the connectivity between the parts corresponds to an industrial standard, such as Peripheral Component Interconnect (PCI) Express, Universal Serial Bus (USB), or the like, the part connectivity unit 312 can select a communication interface corresponding to the industrial standard.

The part connectivity unit 312 can include an interface definition unit 313 having one or more interface definitions that describe properties and connectivity for different types of communication interfaces available for inclusion in a schematic design of a printed circuit board assembly. For example, the interface definition unit 313 can include interface definitions for the industrial standards available for selection by the part connectivity unit 312. Embodiments of the interface definitions will be described below in greater detail.

Figure 4:
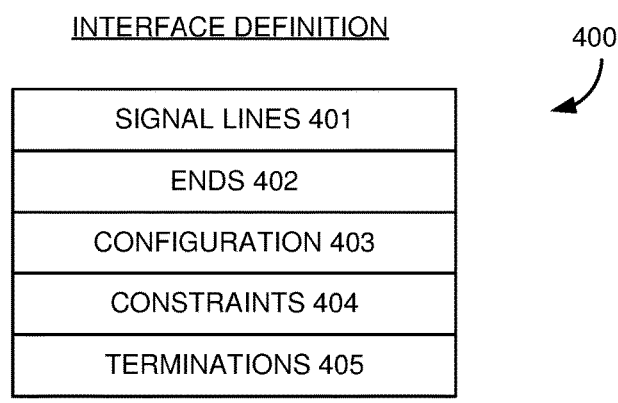
FIG. 4 illustrates an example of an interface definition according to various embodiments.

FIG. 4 illustrates an example of an interface definition 400 according to various embodiments. Referring to FIG. 4, the interface definition 400 can describe properties and connectivity for a communication interface available for inclusion in a schematic design of a printed circuit board assembly. The interface definition 400 can include signal lines 401 corresponding to the signal connectivity of the communication interface. Each of the signal lines can have a different type, such as differential pair, power, ground, data, or the like. When the communication interface includes power, ground, and data connectivity, the interface definition 400 can include a different signal line 401 for each of the different connectivity types.

The interface definition 400 can include ends 402 to describe functions in the communication interface. Each of the ends 402 can include a list of one or more of the signal line 401 that correlate to the ends 402. In some embodiments, the ends 402 of the interface definition 400 can couple with pins of parts in a schematic design to form a connection or net.

In some embodiments, the interface definition 400 can include a configuration 403 to describe a particular implementation of the communication interface. For example, when a type of communication interface can be configured or implemented in multiple different ways, the interface definition 400 can include a configuration 403 to identify which of the multiple implementations the interface definition 400 supports.

The interface definition 400 can include constraints 404 to describe electrical properties and/or physical properties associated with at least one of the signal lines 401 in the interface definition 400, for example, the properties can be correlated on a per signal line basis. In some embodiments, a schematic capture tool can add the constraints 404 to connections formed in a schematic design between multiple parts based on the interface definition 400. The interface definition 400 can include terminations 405 to describe discrete electrical components, such as resistors, capacitors, or the like to add to connections associated with the signal lines 401 in the interface definition 400.

Referring back to FIG. 3, the interface definition unit 313 can correlate the selected type of communication interface to an interface definition. For example, when the part connectivity unit 312 selects a PCI Express interface to connect two parts in the schematic design, the interface definition unit 313 can identify the interface definition correlated to the PCI Express interface in the interface definition unit 313.

The part connectivity unit 312 can include a part mapping unit 314 including mappings between interface definitions and the parts from the parts library 301. The part mapping unit 314, based on the identification of the interface definition to utilize to connect parts in the schematic design, can determine whether a mapping between interface definitions and the parts exists. When the part mapping unit 314 includes a mapping, the part connectivity unit 312 can place an instance of the interface definition in the schematic design and automatically connect the pins of the parts to the ends in the instance of the interface definition based on the mapping. When the interface definition includes constraints for connections, the part mapping unit 314 also can assign constraints from the interface definition to the connections in the schematic design between the pins of the parts to the ends in the instance of the interface definition. When the interface definition includes terminations for connections, the part mapping unit 314 also can add terminations from the interface definition to the connections in the schematic design between the pins of the parts to the ends in the instance of the interface definition.

In some embodiments, the part connectivity unit 312 can select the type of communication interface to utilize between parts placed in the schematic design by placing an instance of an interface definition into the schematic design and associating the instance to the place parts to be connected. The part connectivity unit 312, in response to the placement of the interface definition and association to place parts, can identify the mapping corresponding to the instance of the interface definition and the placed parts, and automatically generate the connections in the schematic design between the parts and the interface definition.

When the part mapping unit 314 does not include a mapping, the part connectivity unit 312 can place an instance of the identified interface definition in the schematic design, access properties of the parts, and compare the properties of the parts to an interface definition to generate a mapping between the part and the interface definition. For example, the part mapping unit 314 can identify names or properties of pins in the parts, such as power, ground, reset, data, or the like, from the parts library 301, and compare them to the signal line names in the interface definition. The part mapping unit 314 also can connect the pins in the parts to the ends in the interface definition in response to user input received by the computing system. In some embodiments, the part mapping unit 314 can utilize the connections between the parts and the interface definition to generate a new mapping between the parts and the interface definition, which the part mapping unit 314 can add to stored mappings between interface definitions and the parts from the parts library 301. By generating new mappings based on connections generated between interface definitions and parts, the part connectivity unit 312 can utilize the new mappings to automatically generate connections between interface definitions and parts in different schematic designs.

The design system 300 can include the printed circuit board layout tool 320 to receive the schematic design of the printed circuit board assembly, such as the netlist 302 and the parts list 303 from the schematic capture tool 310, and convert the schematic design into a layout design 304 of the printed circuit board assembly. The printed circuit board layout tool 320 can provide a design environment to layout the netlist 302 into the layout design 304 by placing parts or components from a parts list 303 onto the representation of printed circuit board. The layout design 304 can describe the electronic device for the product in terms of various components placed and interconnected on a representation of a printed circuit board.

The printed circuit board layout tool 320 can output a display presentation that, when displayed by a display device, can provide an user interface to the design environment, allowing the printed circuit board layout tool 320 to generate the layout design 321 in response to user input. The display presentation can include a graphical display window including at least one representation of the layout design 321 and include various tools or embedded functionality that can allow placement of parts or components from the parts list 312 into the layout design 321.

The layout design 321 initially can represent a blank print circuit board, for example, having dimensions corresponding to one or more physical constraints. The printed circuit board layout tool 320 can receive user input, for example, based on the display presentation, which can prompt the printed circuit board layout tool 320 to perform various updates to the layout design 321 based on the netlist 302, such as place parts selected from the parts list 303 in the layout design 321, route traces between the placed parts, or the like.

Figure 5:
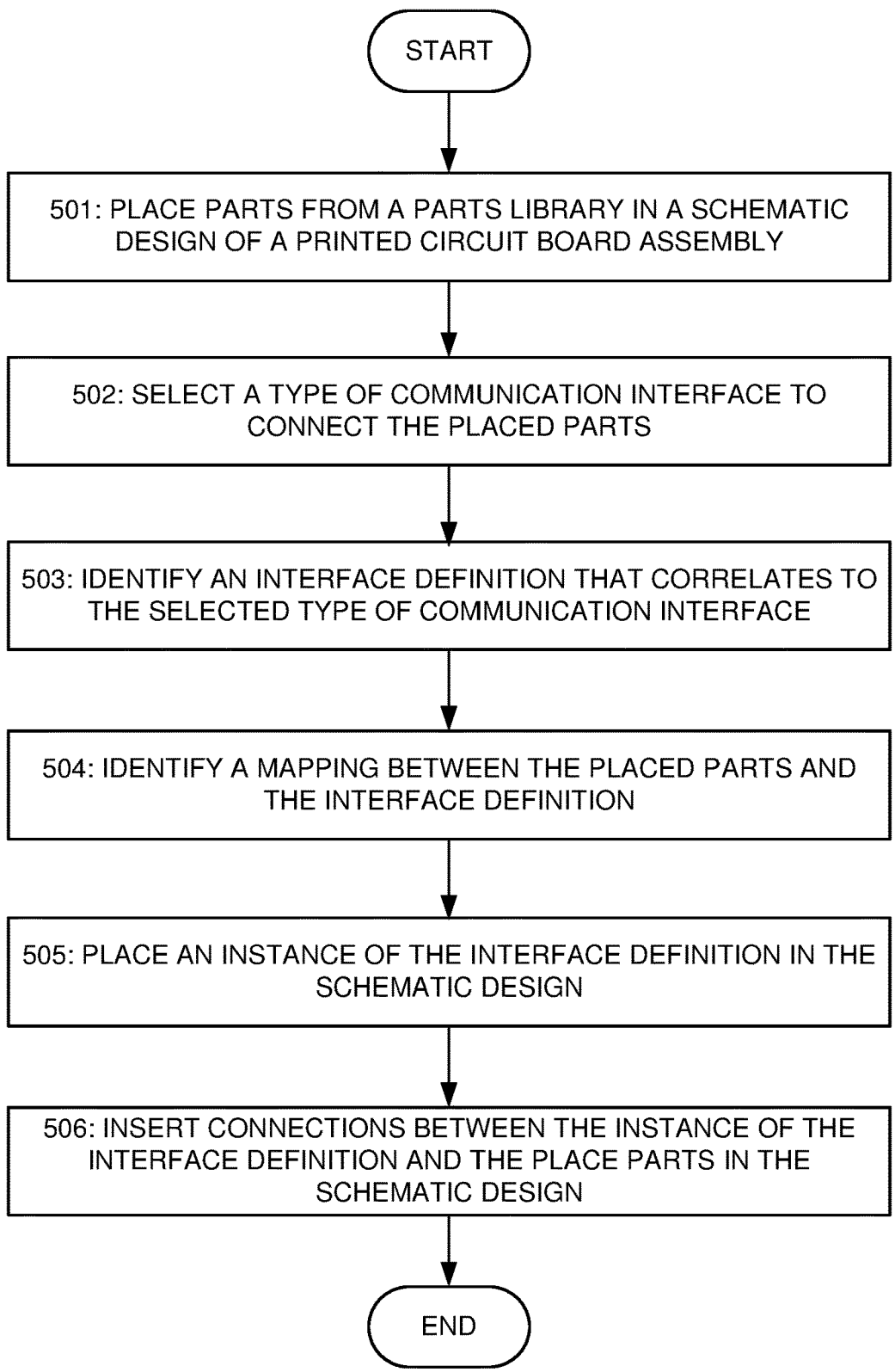
FIG. 5 illustrates an example flowchart for automatically modifying a schematic design of a printed circuit board assembly to connect parts according to various embodiments.

FIG. 5 illustrates an example flowchart for automatically modifying a schematic design of a printed circuit board assembly to connect parts according to various embodiments. Referring to FIG. 5, in a block 501, a computing system implementing a schematic capture tool can place parts from a parts library in a schematic design of a printed circuit board assembly. In some embodiments, the computing system implementing the schematic capture tool can output a display presentation that, when displayed by a display device, can provide an user interface to the design environment, allowing the computing system implementing the schematic capture tool can to place the parts from the parts library into the schematic design in response to user input.

In a block 502, the computing system implementing the schematic capture tool can select a type of communication interface to connect the placed parts. In some embodiments, the computing system implementing the schematic capture tool can utilize the display presentation and associated user interface that form the design environment to receive user input corresponding to the selected type of communication interface. When the connectivity between the parts corresponds to an industrial standard, such as Peripheral Component Interconnect (PCI) Express, Universal Serial Bus (USB), or the like, the computing system implementing the schematic capture tool can select a communication interface corresponding to the industrial standard. In some embodiments, the computing system implementing the schematic capture tool can select the type of communication interface to utilize between parts placed in the schematic design by placing an instance of an interface definition into the schematic design and associating the instance to the place parts to be connected.

In a block 503, the computing system implementing the schematic capture tool can identify an interface definition that correlates to the selected type of communication interface. The computing system implementing the schematic capture tool can access a repository of interface definitions and utilize the selected type of communication interface to identify at least one interface definition correlated to the selected type of communication interface in the repository. For example, when the computing system implementing the schematic capture tool selects a PCI Express interface to connect two parts in the schematic design, the computing system implementing the schematic capture tool can identify the interface definition correlated to the PCI Express interface in the repository.

In a block 504, the computing system implementing the schematic capture tool can identify a mapping between the placed parts and the interface definition. The computing system implementing the schematic capture tool can store a plurality of mappings between interface definitions and the parts from the parts library. In some embodiments, the computing system implementing the schematic capture tool can determine which of the mappings, if any, correspond to the identified interface definition and then determine which of the determined mappings correspond to the parts to be connected. Conversely, the computing system implementing the schematic capture tool can determine which of the mappings, if any, correspond to the parts to be connected, and then identify which of the determined mappings correspond to the identified interface definition.

When the computing system implementing the schematic capture tool does not identify a mapping, the computing system implementing the schematic capture tool can generate a mapping between the parts and the interface definition. For example, the computing system implementing the schematic capture tool can identify names or properties of pins in the parts, such as power, ground, reset, data, or the like, from the parts library, and compare them to the signal line names or ends in the interface definition. Based on a commonality of the pins names or properties and the signal lines in the interface definition, the computing system implementing the schematic capture tool can automatically connect the pins in the parts to the ends in the interface definition. The computing system implementing the schematic capture tool can utilize automatically generated connections to generate a mapping between the part and the interface definition.

In a block 505, the computing system implementing the schematic capture tool can place an instance of the interface definition in the schematic design and, in a block 506, the computing system implementing the schematic capture tool can insert connections between the instance of the interface definition and the place parts in the schematic design. The computing system implementing the schematic capture tool can automatically connect the pins of the parts to the ends in the instance of the interface definition based on the mapping. When the interface definition includes constraints for connections, the computing system implementing the schematic capture tool can assign constraints from the interface definition to the connections in the schematic design between the pins of the parts to the ends in the instance of the interface definition. When the interface definition includes terminations for connections, the computing system implementing the schematic capture tool can add terminations from the interface definition to the connections in the schematic design between the pins of the parts to the ends in the instance of the interface definition.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in a computer-readable memory device. The memory device may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory device may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory devices may be "read only" by design (ROM) by virtue of permission settings, or not. Other examples of memory devices may include, but may not be limited to, WORM, EPROM, EEPROM, FLASH, NVRAM, OTP, or the like, which may be implemented in solid state semiconductor devices. Other memory devices may comprise moving parts, such as a known rotating disk drive. All such memory devices may be "machine-readable" and may be readable by a processing device.

Operating instructions or commands may be implemented or embodied in tangible forms of stored computer software (also known as "computer program" or "code"). Programs, or code, may be stored in a digital memory device and may be read by the processing device. "Computer-readable storage medium" (or alternatively, "machine-readable storage medium") may include all of the foregoing types of computer-readable memory devices, as well as new technologies of the future, as long as the memory devices may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to computing processes, it should be appreciated that various examples of the invention may be implemented using any desired combination of computing processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   selecting, by a computing system, a type of communication interface to connect parts in a schematic design of a printed circuit board assembly;
   locating, by the computing system, a mapping that describes a connectivity between the parts and the selected type of communication interface by traversing a plurality of mappings stored by the computing system to identify the mapping correlated to at least one of the parts and the selected type of communication interface; and
   automatically modifying, by the computing system, the schematic design to connect the parts in the schematic design with the selected type of communication interface based on the mapping.

2. The method of claim 1, further comprising identifying, by the computing system, an interface definition corresponding to the selected type of communication interface, wherein the interface definition includes signal lines corresponding to a connectivity of the selected type of communication interface, and wherein the mapping is configured to identify which pins of the parts couple to the signal lines of the interface definitions.

3. The method of claim 2, wherein automatically modifying the schematic design to connect the parts in the schematic design further comprises placing an instance of the interface definition in the schematic design coupled to the parts based on the mapping.

4. The method of claim 1, further comprising automatically modifying, by the computing system, the schematic design to add constraints to the connection between the parts, wherein the constraints describe electrical properties or physical properties of the connection between the parts.

5. The method of claim 1, further comprising automatically modifying, by the computing system, the schematic design to add terminations to the connection between the parts, wherein the terminations include discrete electrical components added to the connection between the parts.

6. The method of claim 1, wherein locating the mapping further comprises accessing properties of the parts in the parts library, comparing the properties of the parts to the selected type of communication interface, and generating the mapping based on the commonality between the properties of the parts and the selected type of communication interface.

7. An apparatus comprising at least one memory device storing instructions configured to cause one or more processing devices to perform operations comprising:
   selecting a type of communication interface to connect parts in a schematic design of a printed circuit board assembly;
   locating a mapping that describes a connectivity between the parts and the selected type of communication interface by traversing a plurality of mappings to identify the mapping correlated to at least one of the parts and the selected type of communication interface; and
   automatically modifying the schematic design to connect the parts in the schematic design with the selected type of communication interface based on the mapping.

8. The apparatus of claim 7, wherein the instructions are further configured to cause the one or more processing devices to perform operations comprising identifying, by the computing system, an interface definition corresponding to the selected type of communication interface, wherein the interface definition includes signal lines corresponding to a connectivity of the selected type of communication interface, and wherein the mapping is configured to identify which pins of the parts couple to the signal lines of the interface definitions.

9. The apparatus of claim 8, wherein automatically modifying the schematic design to connect the parts in the schematic design further comprises placing an instance of the interface definition in the schematic design coupled to the parts based on the mapping.

10. The apparatus of claim 7, wherein the instructions are further configured to cause the one or more processing devices to perform operations comprising automatically modifying, by the computing system, the schematic design to add constraints to the connection between the parts, wherein the constraints describe electrical properties or physical properties of the connection between the parts.

11. The apparatus of claim 7, wherein the instructions are further configured to cause the one or more processing devices to perform operations comprising automatically modifying, by the computing system, the schematic design to add terminations to the connection between the parts, wherein the terminations include discrete electrical components added to the connection between the parts.

12. The apparatus of claim 7, wherein locating the mapping further comprises accessing properties of the parts in the parts library, comparing the properties of the parts to the selected type of communication interface, and generating the mapping based on the commonality between the properties of the parts and the selected type of communication interface.

13. A system comprising:
a memory device configured to store machine-readable instructions; and
a computing system including one or more processing devices, in response to executing the machine-readable instructions, configured to:
select a type of communication interface to connect parts in a schematic design of a printed circuit board assembly;
locate a mapping that describes a connectivity between the parts and the selected type of communication interface by traversing a plurality of mappings stored by the computing system to identify the mapping correlated to at least one of the parts and the selected type of communication interface; and
automatically modify the schematic design to connect the parts in the schematic design with the selected type of communication interface based on the mapping.

14. The system of claim 13, wherein the one or more processing devices, in response to executing the machine-readable instructions, are configured to identify an interface definition corresponding to the selected type of communication interface, wherein the interface definition includes signal lines corresponding to a connectivity of the selected type of communication interface, and wherein the mapping is configured to identify which pins of the parts couple to the signal lines of the interface definitions.

15. The system of claim 14, wherein the one or more processing devices, in response to executing the machine-readable instructions, are configured to automatically modify the schematic design to connect the parts in the schematic design by placing an instance of the interface definition in the schematic design coupled to the parts based on the mapping.

16. The system of claim 13, wherein the one or more processing devices, in response to executing the machine-readable instructions, are configured to automatically modify the schematic design to add constraints to the connection between the parts, wherein the constraints describe electrical properties or physical properties of the connection between the parts.

17. The system of claim 13, wherein the one or more processing devices, in response to executing the machine-readable instructions, are configured to automatically modify the schematic design to add terminations to the connection between the parts, wherein the terminations include discrete electrical components added to the connection between the parts.

18. The system of claim 13, wherein the one or more processing devices, in response to executing the machine-readable instructions, are configured to locate the mapping that describes the connectivity between the parts and the selected type of communication interface by accessing properties of the parts and comparing the properties of the parts to the interface definition to determine the mapping.

* * * * *